INVENTOR
Henry C. Doennecke
William S. Dorman
ATTORNEY

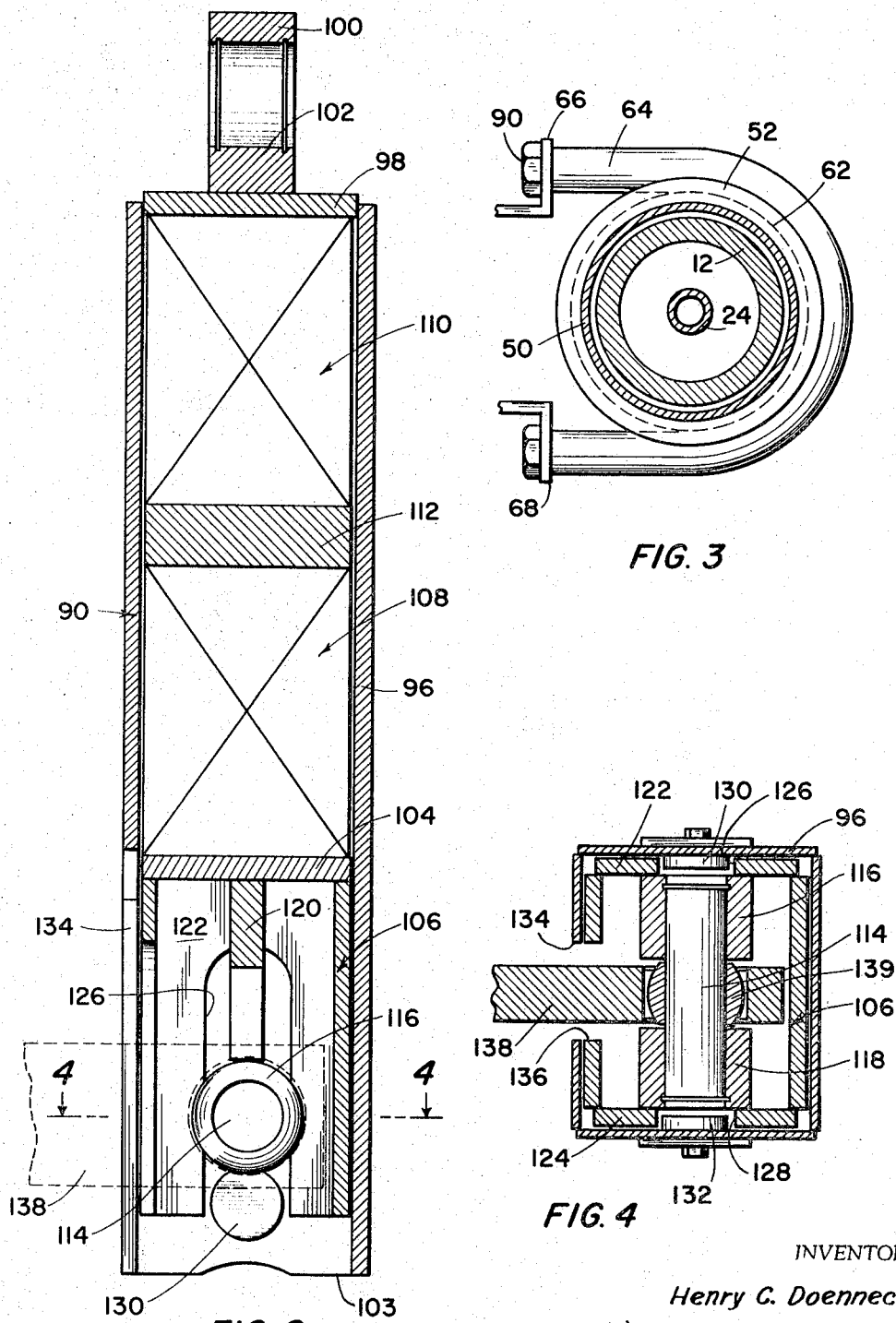

March 7, 1967    H. C. DOENNECKE    3,307,855
LATERAL SUSPENSION MOUNTING
Original Filed Jan. 17, 1964    3 Sheets-Sheet 3
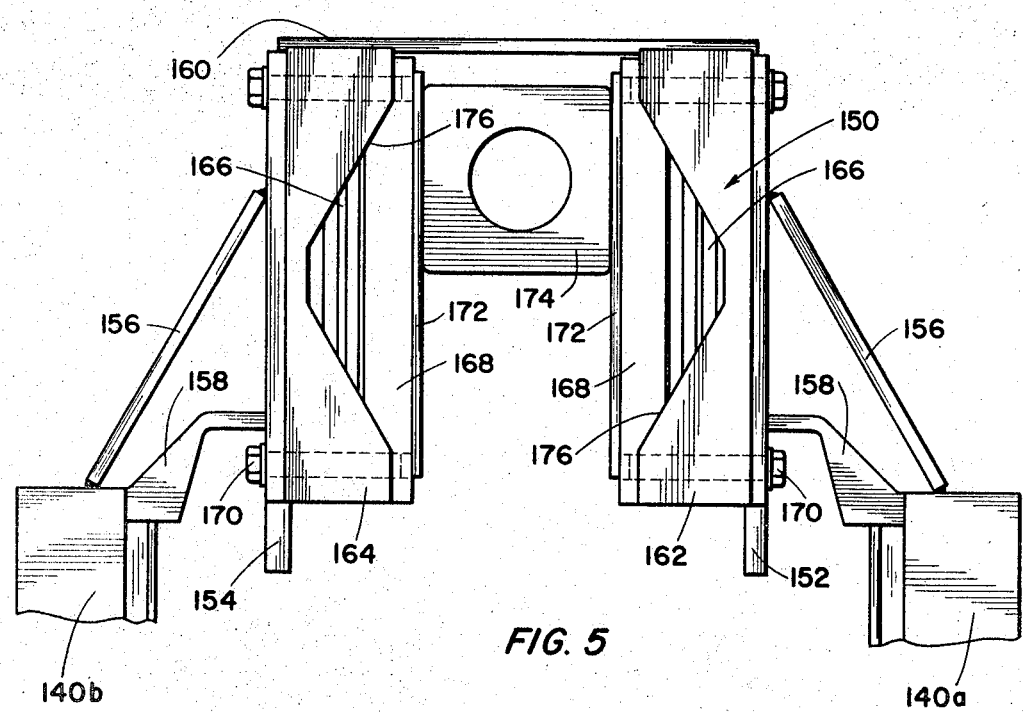
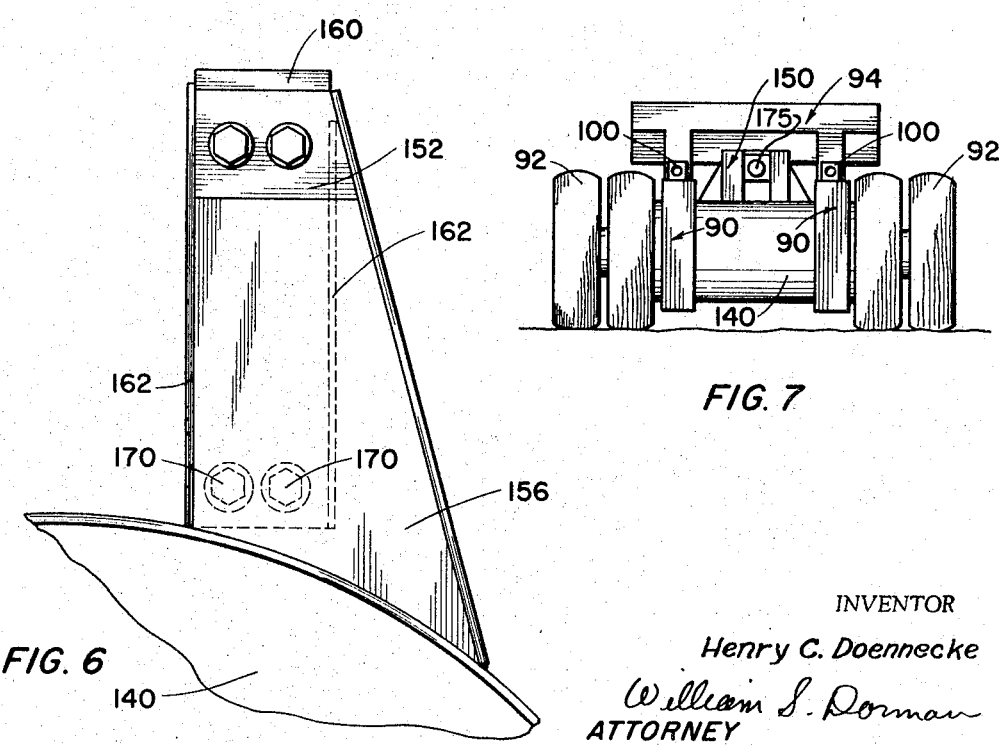
INVENTOR
Henry C. Doennecke
William S. Dorman
ATTORNEY United States Patent Office  3,307,855
Patented Mar. 7, 1967

3,307,855
LATERAL SUSPENSION MOUNTING
Henry C. Doennecke, Tulsa, Okla., assignor to Unit Rig & Equipment Company, Tulsa, Okla., a corporation of Delaware
Continuation of application Ser. No. 471,098, July 12, 1965, which is a division of application Ser. No. 338,459, Jan. 17, 1964. This application May 16, 1966, Ser. No. 558,171
3 Claims. (Cl. 280—124)

This application is a continuation of my copending application Serial No. 471,098 filed July 12, 1965, now abandoned and entitled "Lateral Suspension Mounting" which, in turn, is a division of application Serial No. 338,459 filed January 17, 1964, now Patent No. 3,259,397 and entitled "Suspension Mounting." This invention relates to improvements in suspension devices and more particularly, but not by way of limitation, to a shock absorbing or suspension mounting arrangement for vehicles wherein resilient members are utilized in lieu of fluid cylinder devices, thus eliminating the need for fluid seals, and the like, and providing an increased operating performance.

Most vehicles of today are provided with suspension systems utilizing spring devices or hydraulic cylinders for absorbing the shock as the vehicle is driven or moves throughout its course of travel. The spring devices have certain disadvantages, particularly in utilization with large vehicles, such as off-highway type trucks and the like, in that the tremendous loads encountered and impressed on the devices frequently damage the springs whereby they must be replaced. Those suspension systems utilizing hydraulic cylinders, and the like, normally utilize fluids in the operation thereof, and as a result, fluid seals are required to preclude leakage of the hydraulic fluids from the system and maintain an efficient operation. These fluids frequently fail to maintain a sufficient fluid seal and are usually very expensive in construction. Furthermore, as a practical matter, the shock absorbing performances of the presently available spring devices as well as the reciprocal piston or plunger structures do not provide a sufficiently smooth ride for the operator of these exceptionally large off-highway vehicles. The resulting rough ride is not only uncomfortable, but may be hazardous to the driver of the equipment.

The present invention contemplates a novel shock absorbing or suspension mounting system for vehicles which is particularly designed and constructed for eliminating the use of springs and hydraulic cylinders and the inherent disadvantages thereof. In addition, the novel suspension means is particularly designed and constructed for reducing lateral jarring or shock in the vehicle during operation thereof. The novel suspension mounting arrangement provides a plurality of resilient members disposed within a housing in such a manner as to efficiently absorb the shock as the vehicle is driven along a highway or across rough terrain. The shock absorption performances of the novel suspension mounting have proven extremely efficient and actually provide as smooth a ride for the operator of the equipment which compares favorably with a ride in a passenger vehicle.

It is an important object of this invention to provide a novel shock absorbing system for a vehicle particularly designed and constructed for increased operating results.

It is another object of this invention to provide a novel shock absorbing or suspension mounting system for vehicles so constructed to eliminate the necessity of hydraulic cylinders, and the like, thus eliminating the need for fluid sealing devices.

Still another object of this invention is to provide a novel suspension mounting system for relatively large vehicles utilizing a plurality of resilient shock absorbing members which provide greatly increased shock absorbing performances during the operation of the vehicle.

Still another object of this invention is to provide a novel suspension mounting for off-highway type vehicles wherein the shock absorbing performance is sufficiently efficient for providing a smooth ride for the operator of the vehicle which is comparable to that attainable in a passenger vehicle.

A further object of this invention is to provide a novel suspension mounting which may be arranged in a manner for absorbing both vertical shocks and lateral shocks encountered during the operation of a vehicle.

Other and further objects and advantageous features of the present invention will hereinafter more fully appear in connection with a detailed description of the drawings in which:

FIGURE 2 is a sectional elevational view of a rear wheel suspension mounting embodying the invention.

FIGURE 3 is a sectional view taken on line 3—3 of FIGURE 1.

FIGURE 4 is a sectional view taken on line 4—4 of FIGURE 2.

FIGURE 5 is a front elevational view of a suspension mounting embodying the invention and for absorbing lateral movement in a vehicle.

FIGURE 6 is an end elevational view of the suspension mounting depicted in FIGURE 5.

FIGURE 7 is a schematic view in reduced scale depicting the lateral suspension mounting of FIGURE 5 in association with a vehicle.

*Front suspension mounting*

Figure 1:
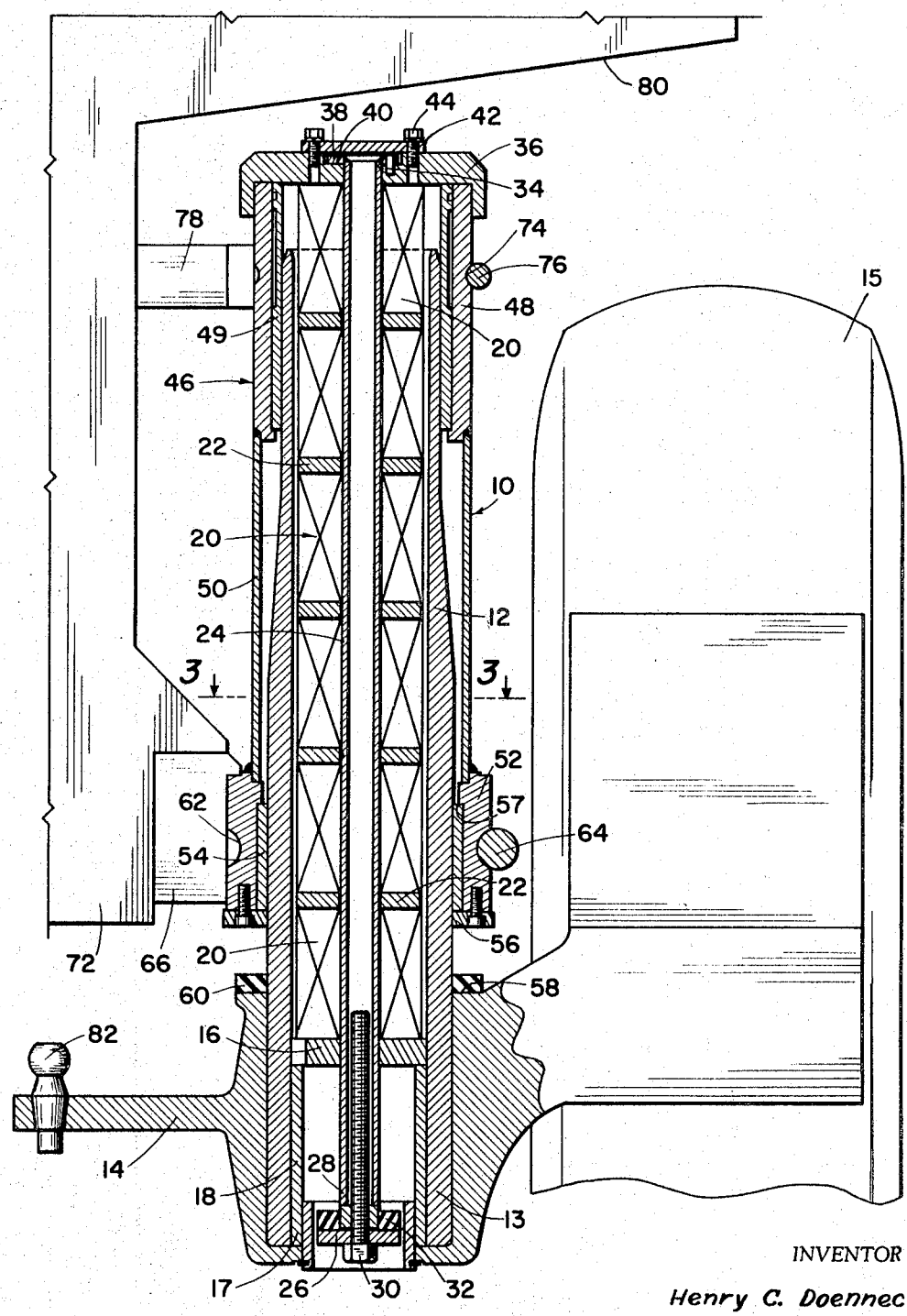
FIGURE 1 is a sectional elevational view of a front wheel suspension mounting embodying the invention and shown in relationship to portions of a vehicle.

Referring to the drawings in detail, and particularly to FIGURES 1 and 3, reference character 10 generally indicates a front suspension mounting device comprising a main or inner housing member 12 which is preferably of substantially cylindrical configuration, but not limited thereto. The sleeve or housing 12 is disposed in or carried by a strut 14 which may be of any suitable type normally utilized for supporting a vehicle wheel 15, particularly the type utilized in relatively large or off-highway vehicles wherein at least the front wheel members thereof are usually independently mounted with respect to the vehicle (not shown). The sleeve 12 is preferably a shrink fit within a bore 13 of the strut 14, or otherwise suitably secured thereto, whereby the sleeve 12 and strut 14 will move as a unit, as will be hereinafter set forth.

An annular support member 16 is disposed within the housing 12 and is preferably spaced from the lower end 17 thereof, as viewed in FIGURE 1, by a suitable spacer sleeve 18. A plurality of groups or sets of resilient members or rubber pads, generally indicated at 20, are stacked or superimposed within the sleeve 12 with the lower most group 20 supported on the member 16. It is preferable to provide a rigid annular spacer member 22 between each adjacent group of resilient members 20 for facilitating the support of the groups or sets within the sleeve 12. A centrally disposed centering rod 24 extends longitudinally through the sleeve 12 and extends through the groups of pads 20, as clearly shown in FIGURE 1. The rod 24 functions as a guide and centering member for the resilient pads 20 during operation of the suspension mounting device 10, as will be hereinafter set forth.

It is anticipated that a suitable bearing such as a thrust bearing, or the like (not shown) may be disposed on the support plate 16 for receiving the lowermost set of pads 20 thereon. This thrust bearing may be included in the column of resilient pads 20 to substantially preclude any rsional "wind up" of the column when the front wheels
5 are turned during steering or operation of the vehicle.
f course, it is to be noted that the thrust bearing may be
sposed on substantially any of the spacers 22 or other-
ise interposed in the column of resilient pads 20 to
ovide the same result.

The rod 24 extends through the support member 16
id is slidable with respect thereto. A stop member 26
secured to one end 28 of the rod 24 in any suitable
anner, such as by the stud member 30, for engagement
ith the support plate 16 to limit the movement of the
d 24 in one direction. An annular resilient member
! is disposed adjacent the upper surface of the stop mem-
r 26 and may be secured thereto in any suitable manner
lot shown) for cushioning the shock of the engagement
tween the support member 16 and stop member 26
hen the rod 24 moves upwardly within the sleeve 12
iring operation of the device 10.

The upper end 34 of the rod 24 protrudes beyond the
per end of the sleeve 12 and extends through a cap
ember 36. An outwardly extending flange member 38
provided on the outer extremity of the rod 24 and is
apted for disposition in a complementary recess 40 pro-
ded in the cap member 36 whereby the rod 24 is sup-
rted at the upper end by the cap 36. A suitable cover
sc 42 is secured to the upper surface of the cap 36 in
y suitable manner such as by a plurality of screws 44
r retaining the flange 38 within the bore or recess 40.
will be apparent from an inspection of FIGURE 1 that
e cap member 36 is spaced from the upper end of
eve 12 in a manner and for a purpose as will be here-
after set forth.

An outer housing generally indicated at 46 is loosely
sposed around the housing 12 and comprises an upper
bular member 48 secured to the cap 36 in any suitable
anner (not shown). The tubular member 46 is spaced
m the inner sleeve 12 by a suitable bushing 49 whereby
e inner sleeve 12 may move both longitudinally and
tatably with respect to the tubular member 46. A
eve 50 is secured at one end to the tubular member 46
d extends downwardly therefrom to a lower tubular
mber 52 which is suitably secured to the opposite end
ereof. The tubular member 52 is spaced from the inner
eve 12 by a suitable bushing 54 which cooperates with
e bushing 49 to permit relative movement between the
er housing 12 and tubular member 52. An annular
g 56 is removably secured to the outer extremity or
ver end of the tubular member 52 for cooperation with
inwardly directed shoulder 57 on the inner periphery
the sleeve 52 for retaining the bushing 54 in position
ound the outer periphery of the sleeve 12. An annular
oulder 58 is provided on the strut 14 and disposed
ound the outer periphery of the sleeve 12 below the
aining ring 56 for receiving an annular resilient mem-
: 60 to provide a cushioning or bumper action during
eration of the device 10 upon longitudinal movement of
housing 12 within the outer housing 46.

The outer housing 46 is preferably rigidly secured to
vehicle, a portion of which is shown in FIGURE 1,
d remains stationary with respect thereto. Of course,
outer housing 46 may be secured to the vehicle in
y suitable manner and as depicted herein, the upper
d lower tubular members 48 and 52, respectively, are
apped to the framework of the vehicle. As more par-
ularly shown in FIGURE 3, an annular groove or re-
s 62 in provided in the outer periphery of the tubular
mber 52 for receiving an arcuate strap member 64
rein. The strap member 64 has the opposite ends
reof secured to oppositely disposed flange members
and 68 in any suitable manner such as by bolts 70.
e flanges 66 and 68 are preferably integral with or
idly secured to the frame 72 of the vehicle. Thus, the
ap 64 may be tightly engaged in the groove 62 for
uring the lower portion of the outer housing 46 to the
me portion 72 of the vehicle. The upper sleeve 48 may be similarly secured to the frame portion 72 of the
vehicle. An annular groove 74 is provided around the
outer periphery of the tubular member 48 for receiving
a strap member 76 therein having the opposite ends se-
cured to suitable bracket members 78 (only one of which
is shown in FIGURE 1) which in turn is secured to or
integral with the vehicle frame portion 72.

Referring particularly to FIGURE 1, the vehicle frame
portion indicated at 72 is preferably one portion of the
vehicle frame which is disposed in the proximity of the
front wheel 16 and the upper portion of the frame 72
preferably extends slightly upwardly and outwardly as
shown at 80 whereby a recess or well is provided for
substantially encasing the device 10 and portion of the
wheel 15. Of course, there is preferably a substantially
identical but reverse arrangement provided on the op-
posite side of the vehicle in the proximity of the other
front wheel. The shock absorbing device 10 is interposed
between the wheel 16 and the frame 72 and is thus some-
what protected by the overhanging portion 80. In addi-
tion, it may be desirable to provide the usual snubber
(not shown) for utilization in conjunction with the sus-
pension mounting device 10. However, as a practical
matter, it has been found that snubbers are not usually
necessary.

Each set of resilient members 20 preferably comprises
a plurality of annular resilient pads so arranged as to
provide for a maximum of support simultaneously with a
maximum of compression. Each pad may comprise a
rigid annular main body (not shown) having a resilient
upper and lower surface bonded or otherwise secured
thereto. The cross-sectional configuration of the resil-
ient surfaces may include longitudinally protruding
nodules whereby one pad member is supported or dis-
posed between the outer extremities of the complementary
nodules of the adjacent upper and lower pads. Pads of
this type are commercially available and provide great
strength for support and yet permit a great flexibility in
compression.

*Front suspension operation*

For purposes of illustration, it is assumed that the front
suspension device 10 is to be utilized with a relatively
large, off-highway vehicle (not shown) having a pair of
oppositely disposed front wheels 15 (only one of which
is shown in FIGURE 1). Each wheel 15 is carried by
a strut 14 which is connected with the steering system of
of the vehicle (not shown) in any well known manner,
such as by the ball member 82 and a cooperating socket
(not shown). Each strut 14 carries a sleeve 12 having
the resilient sets of pads 20 disposed therein. The
sleeves 12 are movably disposed within the respective
outer housing 46 and the outer housings 46 are rigidly se-
cured to the frame 72 of the vehicle.

As the vehicle moves during the course of travel there-
of, the wheels 15 independently jolt or bounce along the
surface of the area being traversed, moving the strut 14
simultaneously therewith. In addition, the strut 14 is
rotated with respect to the vehicle and in a substantially
horizonal plane during steering of the vehicle. This
combined "up and down" and rotational movement of
the strut is transmitted to the sleeve 12 by virtue of the
connection therebetween. The sleeve 12 is thus recipro-
cated and rotated, either independently or simultaneously,
within the outer housing 46. The bushings 49 and 54 fa-
cilitate this movement of the sleeve 12 with respect to
the housing 46.

The rotational movement of the sleeve 12 within the
housing 46 results in a slight twisting of the superimposed
stacks of pads 20 within the housing 46 and is absorbed
The rotational movement of the sleeve 12 is thus not
transmitted to the outer housing 46.

Upward movement of the sleeve 12 within the housing
46 is limited by the engagement of the retaining ring 56
and cushion member 58. As the sleeve 12 moves upwardly within the housing 46, the support member 16 is moved upwardly therewith along the outer periphery of the rod 24 for compressing the resilient groups or sets of pads 20. It will be apparent that the space between the upper end of the housing 12 and the lower surface of the cap member 46 provides sufficient clearance for the longitudinal movement of the housing 12 and thus provides an area to permit the compression and expansion of pads during the reciprocal movement of sleeve 12 within the housing 46. This compression of the resilient pads 20 absorbs substantially all of the upward movement of the sleeve 12 whereby relatively little of the upward movement is imparted to the housing 46. The rod 24 functions as a guide for the plate 16 and pads 20 and maintains the pads centered within the sleeve 12 for faciliating the dampening action of the device 10.

Downwards movement of the strut 14 carrying the sleeve 12 moves the sleeve 12 downwardly within the housing 46 and causes the support plate 16 to move downwardly therewith along the outer periphery of the rod 24 for releasing the compressive force on the pads 20. The resiliency of the pads permits a return to the substantially normal conformation thereof. The downward movement of the sleeve 12 is limited by the engagement of the plate 16 with the cushion member 32 which is disposed on the stop member 26. The length of downward travel of the sleeve 12 permits an absorption of a great amount of corresponding movement of the strut 14 and wheels 15 without transmitting the movement to the outer housing 46.

It will be apparent that the front suspension mounting device 10 absorbs a great amount of the vertical movements of the wheels 15 of the vehicle during operation thereof. A minimum of bouncing or up and down movement is transmitted to the vehicle and as a result, an extremely smooth ride is provided for the operator of the vehicle or equipment, particularly when the front suspension device 10 is utilized in conjunction with a suspension device adapted for use with the rear wheels of the vehicle as will be hereinafter set forth.

*Rear suspension mounting*

Referring now to FIGURES 2 and 4, a rear suspension mounting device or shock absorber generally indicated at 90, is particularly designed and constructed for utilization in combination with the rear wheels 92 (FIGURE 7) of the vehicle, the rear portion of which is generally indicated at 94 in FIGURE 7. The rear suspension device 90 comprises an outer housing 96 which may be of cylindrical or rectangular configuration, as desired, and as depicted herein is of rectangular cross-sectional configuration. The upper end of the housing 96 is closed by a suitable plate 98 which may be welded or otherwise secured thereto. A support member or hanger 100 is secured to the upper surface of the plate 98 and is provided with an aperture 102 extending transversely therethrough for connecting the housing 96 with the vehicle 94 in a manner as will be hereinafter set forth.

The lower end 103 of the housing 96 is open and a support plate 104 carried by a housing 106 is slidably disposed within the housing 96 in the proximity of the open end 103. A plurality of superimposed pads, generally indicated at 108, are disposed within the housing 96 and supported on the plate 104. A second group of superimposed resilient pads, generally indicated at 110, is disposed within the housing 96 and spaced from the first group 108 by a suitable spacer member 112. Whereas two groups of pads are depicted herein, it is to be understood that substantially any desired member thereof may be utilized. The groups of pads 108 and 110 may be of any suitable flexible type, such as those disclosed in the front suspension mounting, but not limited thereto.

A shaft 114 extends transversely through the movable housing 106 and is secured therein in any suitable manner, such as by a pair of spaced aligned sleeve members 116 and 118 which are welded or otherwise secured to a centrally disposed U-shaped web member 120 provided within the housing 106. The side walls 122 and 124 of the housing 106 which are disposed adjacent the sleeves 116 and 118 are provided with aligned longitudinally extending slots or recesses 126 and 128, respectively, for receiving oppositely disposed inwardly extending stop members 130 and 132 which are secured within the housing 96. The stop members 130 and 132 cooperate with the slots 126 and 128 for limiting the downward movement of the inner housing 106 with respect to the outer housing 96 as will be hereinafter set forth in detail.

A longitudinally extending slot 134 is provided on one side of the outer housing 96 and extends upwardly from the open end 103 thereof in alignment with a similar longitudinally extending slot 136 provided in the housing 106. An arm member 138, having one end thereof secured to or journalled on the shaft 114 in any suitable manner, such as by a spherical bushing 139, extends radially outwardly from the shaft 114 and through the aligned slots 134 and 136 into connection with the axle structure 140 (FIGURE 7) extending between the rear wheels 92. In this manner, the inner housing 106 and support member 104 carried thereby are rigidly connected or secured to the axle structure 140 for movement simultaneously therewith whereby the housing 106 will be reciprocated within the housing 96 during operation of the vehicle.

Whereas the axle structure 140 shown in FIGURE 7 is a single transversely extending unit, it is to be understood that it may be desirable to provide independent axle structures for the complementary pairs of wheels. In this event, a rear suspension mount 90 will be provided for each axle structure.

*Rear suspension operation*

The rear suspension mounting device 90 is secured to the vehicle in the proximity of the rear wheels 92 thereof for absorbing the shock encountered by the rear wheels during operation of the vehicle. It is preferable to utilize at least two of the devices 90, one being disposed in the proximity of each pair of complementary rear wheels. The outer housing 96 of each device 90 is secured to the rear portion 94 of the vehicle in any suitable manner, such as by a shaft or pin member (not shown), extending through the aperture 102 of the support or hanger member 100. In this manner, the housing 96 moves simultaneously with the vehicle. As hereinbefore set forth, the housing 106 and support plate 104 carried thereby are slidably disposed within the housing 96 and are in rigid connection with the axle 140 of the rear wheels 92 through the arm member 138. Thus, the housing 106 and support plate 104 move simultaneously with the rear wheels and independently from the vehicle itself.

As the vehicle moves throughout its course of travel, the rear wheels fluctuate in accordance with the roughness of the terrain being traversed. Any upward movement of the rear wheels moves the associated housing 106 and support plate 104 upwardly within the housing 96 for compressing the sets or groups of pads 108 and 110. A considerable amount of compression is permitted by the resilient pads in the groups and, thus, substantially all of the vertically upward movement of the wheels is absorbed without transmitting said movement to the vehicle. Conversely, downward movement of the rear wheels moves the housing 106 and support plate 104 downwardly within the housing 96 for releasing the compression pressure on the pads 108 and 110. It will be apparent that substantially all of the downward vertical movement of the wheels will be absorbed without transferring thereof to the vehicle. The oppositely disposed stop members 130 and 132 provided within the housing 96 cooperate with the corresponding slots 126 and 128 of the housing 106 for limiting the downward movement of the housing 106 h respect to the housing 96 and precluding accidental
hdrawal of the housing 106 from disposition within
housing 96.
When the vehicle is fully loaded, the weight thereof
l be considerably greater than when it is unloaded or
tially loaded. The housing 96 will be positioned lower
h respect to the housing 106 in the loaded condition of
vehicle, but the compression distance allowable in
groups of pads 108 and 110 is specifically selected
ereby even in the fully loaded condition of the vehicle,
re is still sufficient compression area or space remain-
to assure an efficient operation of the rear suspension
ice 90.

Lateral suspension mounting

Referring now to FIGURES 5, 6 and 7, a lateral shock
sorbing or suspension mounting device, generally indi-
ed at 150, is depicted which is adapted for providing
resilient or yielding support between the vehicle and
rear wheels thereof in lieu of the usual leaf springs
ot shown) and the like, normally utilized in vehicles of
s type. The lateral suspension mounting device is pref-
bly mounted on the outer periphery of the axle 140 ex-
ding between the rear wheels 92 of the vehicle and
ends upwardly therefrom substantially centrally dis-
sed between the wheels as shown in FIGURE 7.
The lateral suspension device 150 comprises a pair of
iced plate members 152 and 154 secured to or supported
the axle structure 140 in any suitable manner. As
picted herein, an angularly disposed web or plate 156
y extend between each plate 152 and 154 and the
e structure 140 and is preferably welded or otherwise
idly secured therebetween. In the event the axle struc-
e 140 comprises two individual axle members, as
einbefore set forth, the plate 152 may be secured
one of the axles 140a (FIGURE 5) and the plate 154
y be secured to the other axle 140b. In addition, a
table support bracket 158 may be secured between the
ites 152 and 154 and the respective axle members
0a and 140b.
A cover or top member 160 is secured between the
per ends of the plates 152 and 154. A pair of spaced
vardly directed side plate members 162 are secured to
inner surface of the plate 152 and a pair of similar
e plates 164 (only one of which is shown in FIGURE
are provided on the inner surface of the plate 154.
bottom plate (not shown) is secured between each
the complementary pairs of side plates 162 and 164
is providing a pair of oppositely disposed chambers
receiving a plurality of flexible pad members 166
rein.
A compression member 168 is disposed adjacent the
posed surface of the outermost pad 166 in each of the
d chambers and a plurality of spaced stud or guide
mbers 170 extend through each plate 152 and 154 and
associated chamber and respective compression mem-
r 168 whereby each compression member 168 may
ove back and forth within its respective chamber for
ernately compressing and releasing the pressure on the
ds 166 in association therewith. It is preferably that
pads 166 be in a precompressed condition at a pre-
ected compression pressure and this may be accom-
shed in any suitable manner (not shown).
A wear plate or bearing plate 172 is suitably secured
the exposed surface of each compression member
8 for slidably receiving an apertured block member
4 therebetween. The apertured block 174 may be of
y suitable type and configuration and is secured to the
ir portion 94 of the vehicle in any well known manner,
ch as by a shaft 175 (FIGURE 7) which may be secured
the vehicle in any suitable manner and extends through
apertured block 174 and is suitably secured thereto.
e block 174 is thus movable simultaneously with the
hicle and is slidable with respect to the plates 172 upon
ative movement between the vehicle and the rear
wheels 92. The side plates 162 and 164 are preferable
relieved, as shown at 176 in FIGURE 5, for ease of in-
stallation and removal of the pads 166 from the respective
chambers.

Lateral suspension operation

The lateral suspension device 150 may be secured to
the axle structure 140, as hereinbefore set forth, whereby
the entire device moves simultaneously with the rear
wheels 92 of the vehicle. The block 174 is disposed
between the wear plates 172 and in turn is secured to
the rear portion 94 of the vehicle. During operation
of the vehicle, the vehicle usually oscillates in a lateral
direction independently of the wheels. This action causes
the block 174 to move in a lateral direction and thus
bears against one of the plates 172 with greater force
than against the other of said plates 172. One set of
pads 166 will thus be compressed with a greater force
than the other set of pads for absorbing substantially
all of the lateral motion of the vehicle without trans-
mitting this lateral movement to the rear wheels 92.
Of course, any vertical variations of movement be-
tween the vehicle and the rear wheels will cause the
block member 174 to ride vertically between the plate
members 172. It will be apparent that there is thus no
transmission of vertical movements between the vehicle
and the rear wheels. It will be further apparent that the
block 174 is limited in its movement in one direction by
the top member 160 and is limited in its movement in
an opposite direction by the axle structure 140.
As the vehicle oscillates or moves from side to side
laterally with respect to the wheels, first one compression
plate 168 is moved by the block 174 for compression of
the respective pads 166 and then the other of said com-
pression plates 168 is moved against the respective pads
166. The resiliency of the pads absorbs substantially
all of the lateral movement of the vehicle with respect
to the wheels, or conversely, of the wheels with respect
to the vehicle.

Summary

The present invention provides a novel supporting or
suspension devices for utilization with a vehicle, particu-
larly a relatively large vehicle, wherein a plurality of
complementary resilient compression members or pads
are utilized for absorbing relative motion between various
components of the vehicle. The front suspension mount-
ing device is preferably of a cylindrical configuration
wherein absorption is provided for both vertical fluctua-
tions and rotational variances of the wheels and frame
of the vehicle. The rear suspension structure normally
does not require rotational compensation and is accord-
ingly particularly constructed for absorbing vertical
fluctuations between the rear wheels and the vehicle
itself. A similar application of flexible pad members
is utilized to compensate for or absorb lateral variations
of movement, particularly between the rear wheels and
the vehicle.
As a practical matter, it has been found in a large
vehicle of the off-highway type that a combination of
suspension devices utilizing the principle disclosed herein
provides a smooth ride for the operator of the equipment
which is comparable to the ride attainable in a passenger
vehicle. Thus, the overall operation of the vehicle is
greatly facilitated by providing an ease of driving and
riding for the operator thereof.
From the foregoing, it will be apparent that the present
invention contemplates a novel suspension or shock ab-
sorbing structure for vehicles utilizing a plurality of
resilient members in combination for absorbing sub-
stantially all shock or movement variances between the
wheels of a vehicle and the framework thereof. The
novel suspension devices embodying the invention are
simple and efficient in operation and economical and
durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A suspension mounting device for a wheeled vehicle having front and rear wheels and comprising a support housing rigidly secured to the rear wheels, a pair of oppositely disposed chambers provided in the support housing, said chambers having the facing sides thereof open, a plurality of resilient pad members disposed in each of said chambers, block means disposed above the rear wheel axis and interposed between the open sides of said chambers, means connecting said block means with the vehicle, compression plate means disposed adjacent the outer-most resilient pad member disposed in each chamber and bearing against said block means, said compression plate means cooperating with said block means for alternate compression and expansion of the resilient pad members upon relative lateral movement between the rear wheels and the vehicle for absorbing substantially all of said lateral movement.

2. A suspension mounting device for a wheeled vehicle having front and rear wheels and comprising a support housing rigidly connected with the rear wheels, a pair of oppositely disposed chambers provided in the support housing and having the facing sides thereof open, a plurality of resilient pad members disposed in each chamber, a compression plate member disposed adjacent the exposed resilient pad member in the open side of each chamber and reciprocally disposed within the respective chamber, guide means extending through each chamber and into engagement with the respective compression plate member for guiding the reciprocal movement of the compression plate member with respect to its respective chamber, a wear plate carried by the exposed surface of each compression plate, a block member disposed above the rear wheel axis and interposed between the wear plate members and slidable with respect thereto, said block member being rigidly secured with the vehicle for movement simultaneously therewith independently from the wheels, said block member cooperating with said compression plates for alternate compression and expansion of the resilient pad members upon relative lateral movement between the vehicle and the rear wheels whereby said lateral movement is absorbed.

3. A suspension mounting device for a wheeled vehicle having front and rear wheels and comprising a support housing rigidly connected with the rear wheels, a pair of oppositely disposed chambers provided in the support housing, said chambers being disposed in substantially horizontal alignment and having the facing sides thereof open, a plurality of resilient pad members disposed in each chamber, a compression plate member slidably disposed in each chamber adjacent the exposed resilient pad member disposed therein, a plurality of stud members extending through each chamber and respective compression plate member for guiding the movement of the compression plates within the chambers, a wear plate carried by the inwardly exposed face of each compression plate, a block member disposed above the rear wheel axis and interposed between the wear plate members and vertically movable with respect thereto, said block member being secured with the vehicle for movement simultaneously therewith independently from the wheels, said block member cooperating with said compression plates for alternate compression and expansion of the resilient pad members upon relative lateral movement between the vehicle and the rear wheels whereby said lateral movement is absorbed.

References Cited by the Examiner
UNITED STATES PATENTS

| | | | |
|---|---|---|---|
| 3,111,335 | 11/1963 | Hickman | 267—20 X |
| 3,133,745 | 5/1964 | Granning | 267—68 X |

BENJAMIN HERSH, *Primary Examiner.*

P. GOODMAN, *Assistant Examiner.*